UNITED STATES PATENT OFFICE.

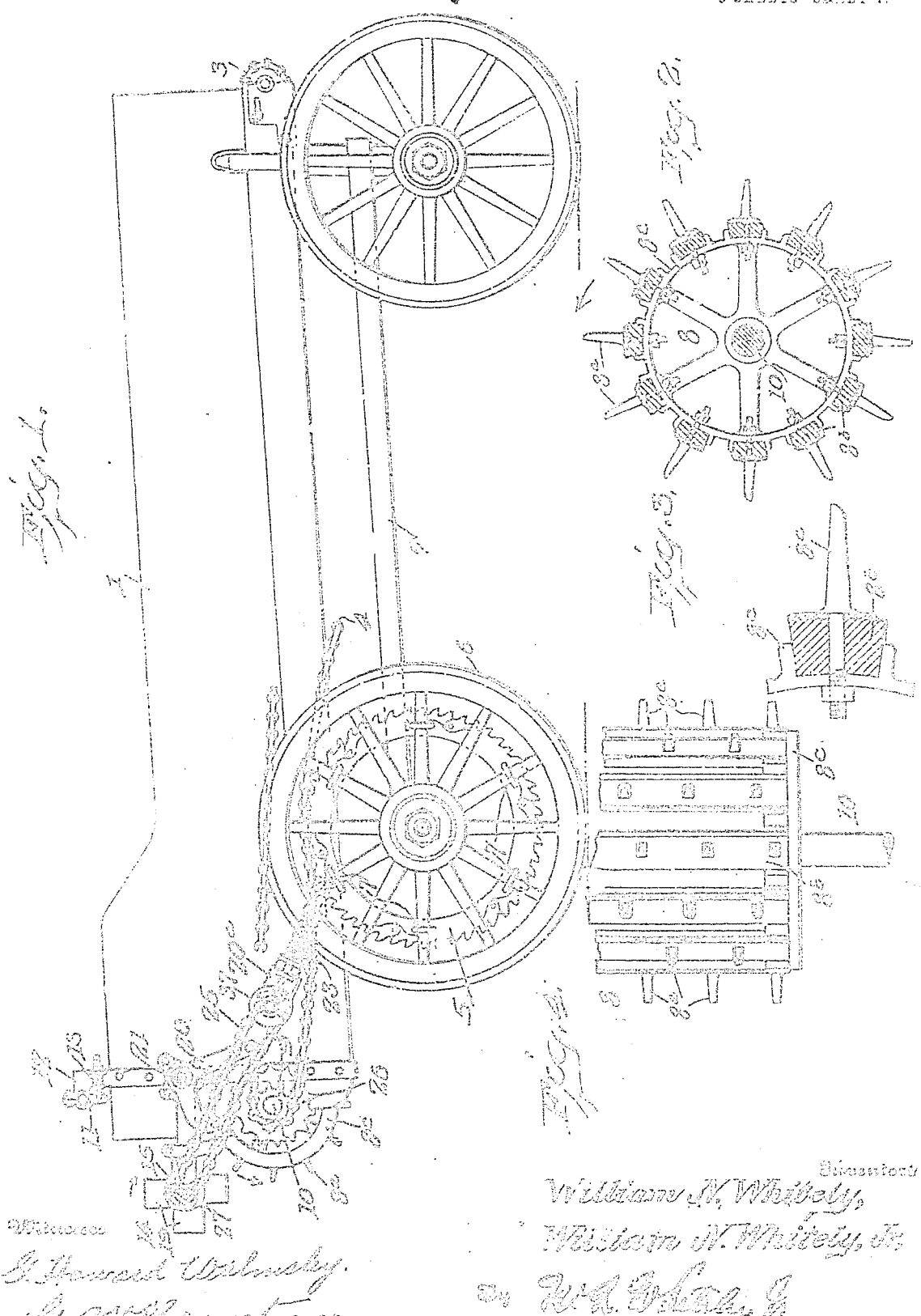

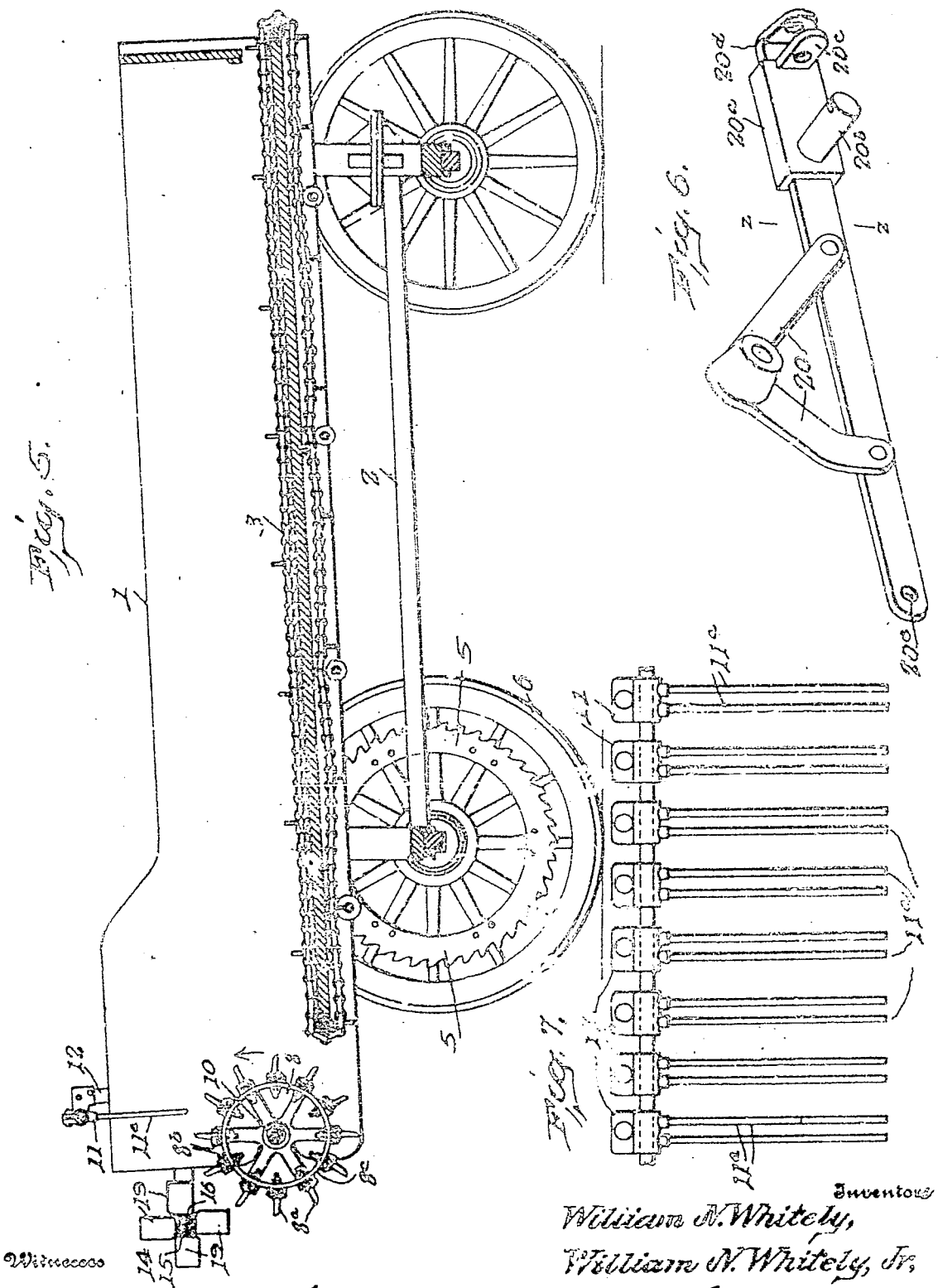

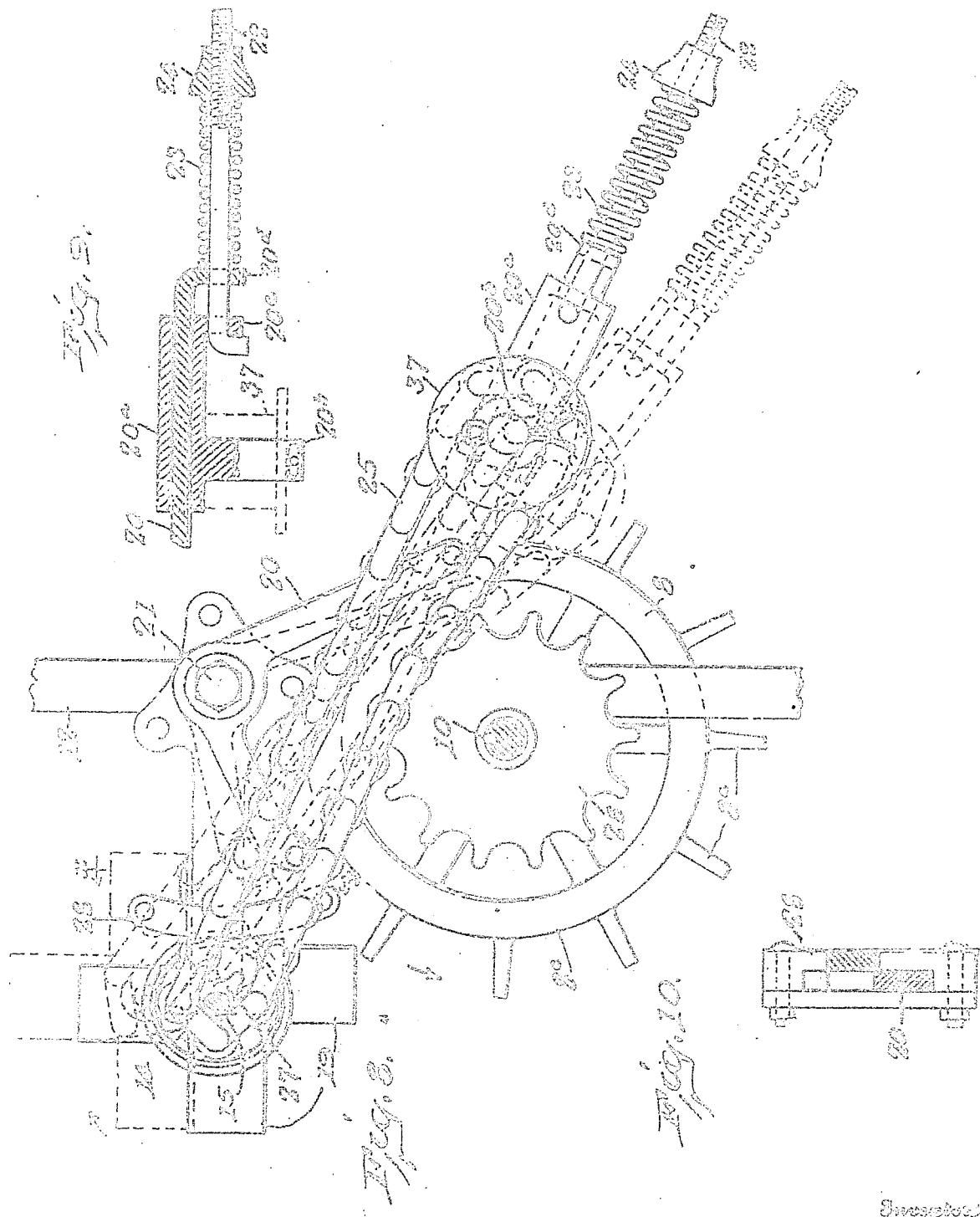

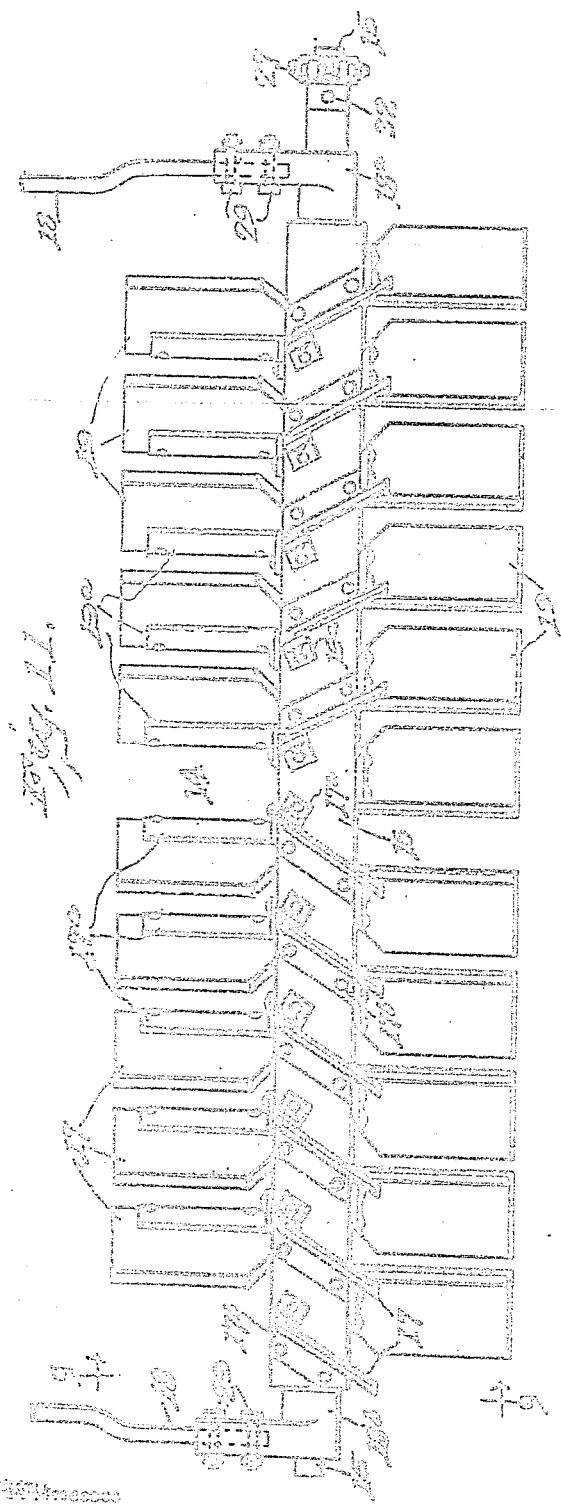
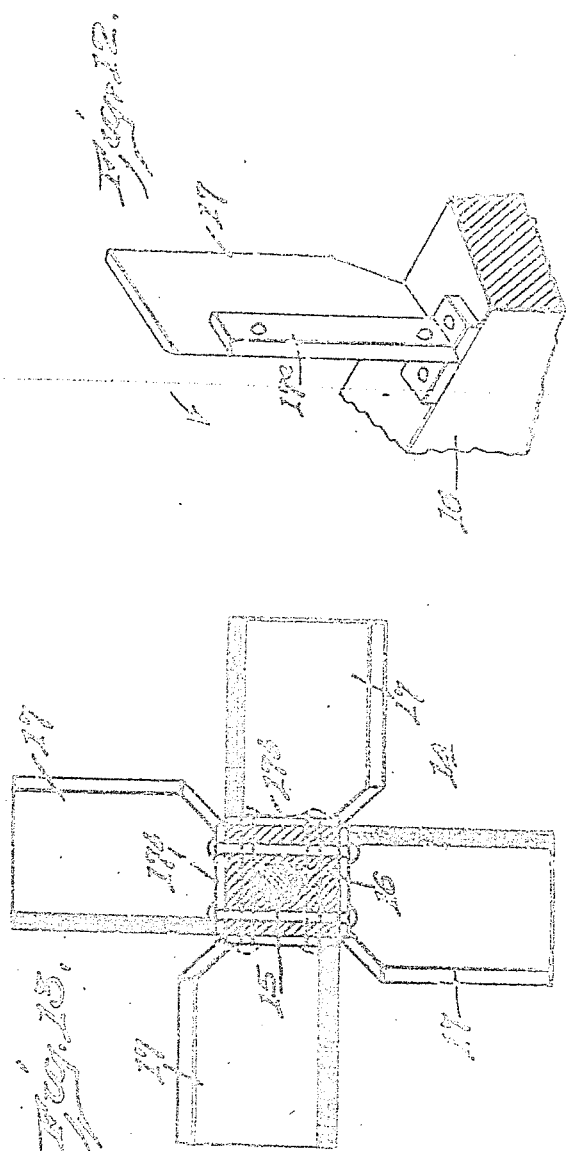

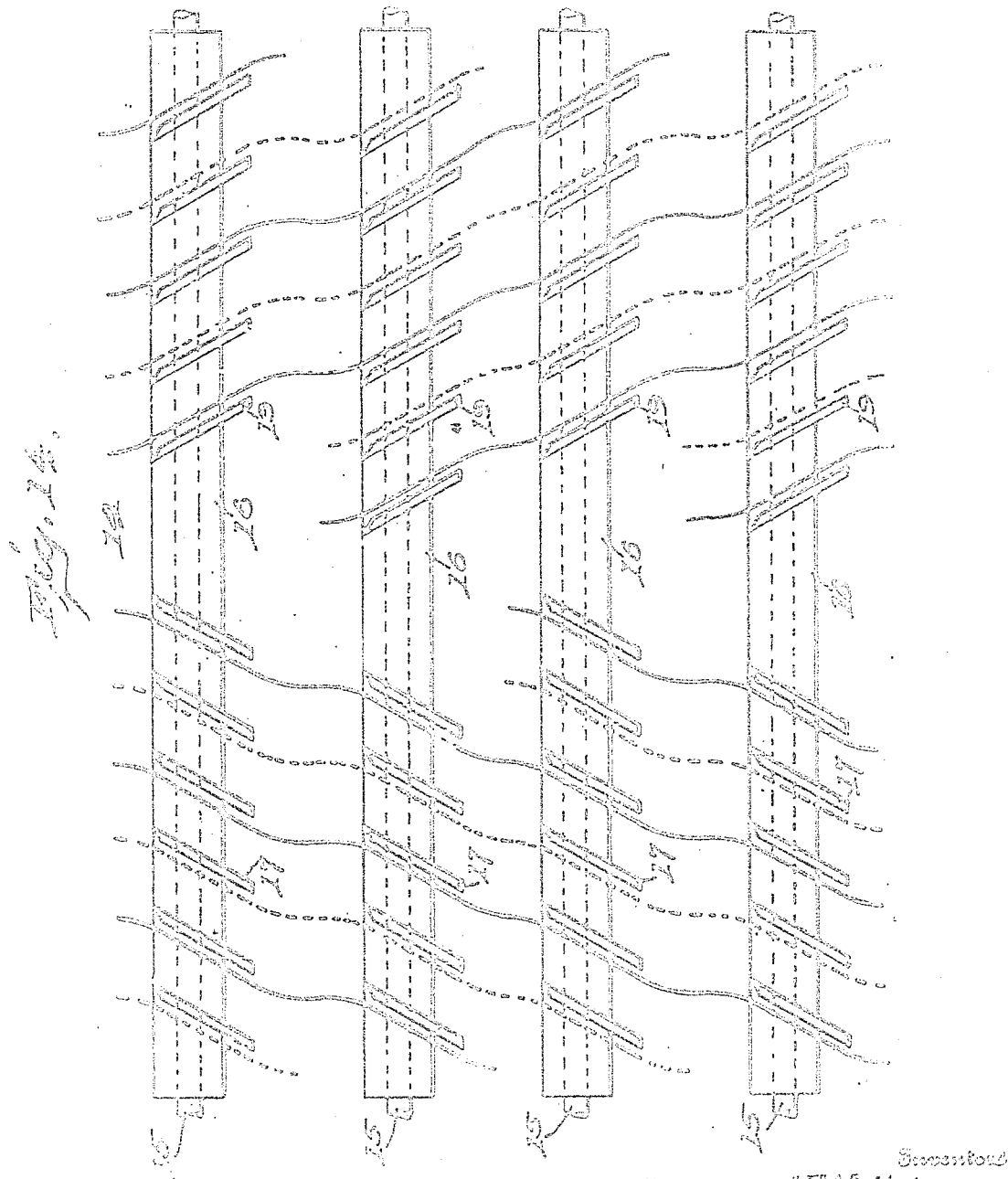

WILLIAM N. WHITELY AND WILLIAM N. WHITELY, Jr., OF SPRINGFIELD, OHIO.

MANURE-SPREADER.

950,547.

Specification of Letters Patent.

Patented Mar. 1, 1910.

Application filed February 16, 1909. Serial No. 478,335.

*To all whom it may concern:*

Be it known that we, WILLIAM N. WHITELY and WILLIAM N. WHITELY, Jr., citizens of the United States, residing at Springfield, in the county of Clark and State of Ohio, have invented certain new and useful Improvements in Manure-Spreaders; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

Our invention relates to improvements in manure spreaders.

The objects are, in part, first, to spread an even swath of finely ground manure with the edges of the swath clearly demarked and to prevent loose scattering of the material irregularly over the ground; second, to spread the manure evenly and uniformly over the entire width of the swath within an approximately circumscribed area, the width of said swath so spread being much wider than the manure carrying body or main discharge cylinder; third, to break up, disintegrate and cut the clods, chunks or masses into small bits prior to deposit on the ground; fourth, to force feed the manure directly downward to the ground so that the wind or other agencies cannot divert the manure out of its proper deposit path while being spread; fifth, while in operation to clean the discharge or primary cylinder of any obstruction or clinging manure or refuse material; sixth, to provide a manure spreader from which the manure, if piled high in the body will not "water fall" or spill over the discharge end in profuse masses while in operation; seventh, to so construct the mechanism of our invention that indestructible foreign pieces or obstacles like sticks of wood, bricks, stones, etc., if loaded in with the manure will not cause injury while being discharged.

In the drawings:—Figure 1, Sheet 1, is a right side view (so called when looking from the rear or dischargeward end of spreader) of a manure spreader of the "wagon box" type, showing one type of the "driving mechanism or "means" that may be employed to impart motion to the "secondary cylinder" dischargeward of the "primary" or discharging cylinder. Fig. 2, Sheet 1, is an enlarged scale sectional view of one type of the "primary" cylinder on a vertical plane about midway of the width of the "body." Fig. 3, Sheet 1, is an enlarged scale sectional view of one type of the "projections" or teeth of the "primary" cylinder showing method of securing same to cylinder rail. Fig. 4, Sheet 1, is an enlarged scale plan view partially broken away of one type of "primary" cylinder that may be used with our invention. Fig. 5, Sheet 2, is a sectional view of Fig. 1, on a vertical plane about midway of the width of the "body." Fig. 6, Sheet 2, is an enlarged scale perspective view of one type of the "frame" that supports the "secondary" cylinder and the driving mechanism or "means" that imparts motion thereto. Fig. 7, Sheet 2, is an enlarged scale front or face view of one type of "detainer" used above the "primary" cylinder to regulate the discharge of manure and assist in pulverizing the same. The "detainer" supports are broken away. Fig. 8, Sheet 3, is an enlarged scale "right" side view of one type of driving mechanism or "means" for imparting motion to the "secondary" cylinder showing an end thereof and in dotted lines the position the cylinder may assume by reason of the "frame" swinging up and carrying the cylinder with it to allow indestructible foreign obstacles to pass out of the machine without injury thereto. Fig. 9, Sheet 3, is an enlarged scale plan view, partly in section of an "equalizing" device that may be used to take up "slack" in the driving mechanism and compensate the variations thereof. Fig. 10, Sheet 3, is an enlarged scale view of a "stop" device looking toward the discharge end of the machine on lines $x$—$x$ of Fig. 8, whereby the movement of the mechanism of Fig. 8 may be limited. Fig. 11, Sheet 4, is an enlarged scale plan view of the "secondary" cylinder showing an arrangement of the "blades," their fastenings, one means of supporting the cylinder in rigid fashion and another type of means whereby breakage or injury to the machine from the passage through it of indestructible objects may be prevented. Fig. 12, Sheet 4, is a "blade" of the "secondary" cylinder in perspective on the same scale as Fig. 12, showing its fastening to the "secondary" cylinder.

Fig. 13, Sheet 4, shows the "blades" from a sectional side view on lines y—y of Fig. 11. Fig. 14, Sheet 5, is on the same scale as Fig. 11, Sheet 4, and shows all the "blades" arrangement on all four sides of the "secondary" cylinder "step by step," and in a screwlike form, there is a "master" screw on each side and another independent spiral within the volute of the "master" screw, the first-named being shown in solid lines and the last in dotted lines.

The "body" 1 is preferably of the "wagon box" type resting on a "running gear" 2 of the ordinary kind.

As seen in Fig. 5 the "means" for moving the "manure" is a "slatted feed belt" 3 of the "endless" type (means for giving it motion not shown).

As the driving mechanism for the belt 3 is not directly concerned in our invention it is understood that any well known means may be employed and therefore it is not necessary to be shown.

While we preferably employ a "wagon box" type of spreader and "endless slatted feed belt" with "primary" cylinder of standard design, yet there are many other constructions that may be used in combination with our improvements to attain the objects set forth.

The main drive chains 4 and sprockets 5 are of the usual construction employed in this type of machine and need no further description, nor does the mechanism whereby they are engaged and disengaged need to be shown or described as any of the well known devices for this purpose shown in this art may be utilized. The main drive devices may be varied in form and method of operation at will but those shown are preferably used. The sprockets 5 are fastened to the inner sides of wheels 6 by U-shaped double end bolts 7 and the chains are arranged to contact with the sprockets 5 as shown in Fig. 1, whereby the right direction of motion is given to the form of "primary" cylinder 8 shown in Figs. 2 and 4. As is usual the "discharge" or "primary" cylinder 8 is itself directly driven by means of a small sprocket 9 which has the well known pawl and ratchet connection (not shown) intervening between said sprocket 9 and the live shaft 10 of the cylinder 8 whereby backing and turning are accommodated.

The cylinder 8 is of good diameter and located low and at the rear with respect to the slatted feed belt 3's conveying side as is the best practice (see Fig. 5). The cylinder 8 may be supported by any well known form of bracket (not shown) at either end as may be deemed most suitable. The cylinder 8 has the usually arranged "projections" or teeth 8ª firmly attached to rails 8ᵇ which are in turn preferably rigidly connected to the cylinder head 8ᶜ (Figs. 2, 3, and 4.) We provide a "detainer" 11, shown in Figs. 5 and 7 whereby the manure may be piled high in the "body" 1 and yet not be spilled out in transit from the yard to the field, this "detainer" 11, also assists in the operation of spreading, serving the function of a "foil" to the cylinder 8, increasing its pulverizing qualities and aiding in preventing a "rush" of manure, which otherwise might occur, due to intertwined corn stalks or congealed bunches or chunks attempting to leave the "body" in a large mass.

The "detainer" 11 may be supported in any well known way and may be of any well known form, and operate in any well known manner and while it is preferably used, yet it may be dispensed with entirely. As shown in Figs. 1 and 5 there are standards 12 supporting other mechanism and which may as well serve to support the "detainer" 11 if used. It will be seen that the "detainer" 11 is composed of a series of round teeth 11ª closely spaced, and these should be of spring metal and disposed above the cylinder vertically near a vertical line drawn through the "cylinder" 8's axis. A spring connection 13 yieldably arranged in any well known manner should be auxiliary to the tension of the teeth 11ª so that the detainer may swing dischargeward as a unit in an emergency and be sharply returned to a normal position.

As the foregoing devices are all well known it will not be necessary to more minutely describe them.

The "secondary" cylinder 14 is preferably made with an axle or core 15 of round cold rolled steel surrounded tightly by a square bar of wood 16 which is rigidly connected thereto, this bar 16 may be of any shape but preferably is square so that the "blades" 17 and 19 may be easily and firmly secured thereto. As shown in Figs. 11 and 12 these "blades" 17 and 19 are riveted to braces 17ª and 19ª and the braces riveted to the bar 16, the "blades" 17 and 19 also have an integral portion as at 17ᵇ 19ᵇ (Fig. 11) riveted to said bar 16. The "blades" may however be bolted to the bar 16 so as to be more easily removable or they may be directly connected to the core or axle 15 in any well known manner.

It will be noted that from a point about midway of the length of the "cylinder" 14 between the supports 18 thereof (Fig. 11) the "blades" start to diverge in a screwlike fashion in "series" radially and obliquely to the axis of said "cylinder" 14 to the right and left (looking from the dischargeward end of the machine) each "blade" 17 of the left series is preferably a duplicate of the others of that "series" and the "blades" 19 of the opposite or "right" "series" preferably duplicates of each other as well and are secured in the same manner as the "left" series. The blades may be arranged to project at various angles from the axle 15 and they may be set so that those on any one side or any series having a co-incident angle of projection may be in or out of line peripherally and circumferentially with those on another side of cylinder 14 or projecting therefrom at a different angle. The "blades" 17 and 19 may be made of tough thin spring steel, so as to tear apart and shred the manure as it flows from the "primary" cylinder 8. The "blades" of each series are preferably set in a double screwlike shape, they are screws "mutilated" so that there may be a multiplicity of extensive thin edges to present to the manure flow in opposition to the "projections" or teeth 8a of the "primary" cylinder 8. Experience has taught that if the "pitch" of the screw to the right and left is too great or too coarse that the "blades" 17 and 19 so placed will not correctly direct the manure but will merely "bat" it down to the ground without tearing or shredding it up fine, this latter results because if the "blades" present their broad sides to the face of the "primary" cylinder they cannot rend and tear the material to be worked on. If on the contrary the "blades" are set in a fine pitched screw they will not direct the manure in its proper course. Thus it will be seen that to get the best results the series of "blades" should be so pitched in screw form that they will not only shred and tear but also direct the manure so as to make a uniform and even spread of finely cut bits of manure within a circumscribed, sharply defined width of spread.

We have heretofore stated that the "blades" 17 and 19 are preferably set in a double screwlike shape, or one screw within the other, this may be seen in Fig. 14 wherein the solid line represents one continuous screw and the dotted lines another. By reason of this construction there is no wide space left between the spirals or volutes formed from the arrangement of the "blades" as in the above figure, so that no chunks or masses can find room to escape unbroken and the manure is played upon by the "blade's" thin edges at many points across the face of the "primary" cylinder 8. If the screws were unmutilated or perfectly shaped merely their peripheries could be sharpened and thus the violent or "dynamic" blows necessary to rend the manure would not be present in force. The action of an unmutilated screw is "static" as experience has shown and is futile to either appreciably tear apart or direct the stream of manure.

We have explained the objects of our inventions. Of these the first four stated are accomplished mainly by the mechanism set forth above. The ordinary manure spreader merely unloads the manure in a thick chunky mass at the center of the path or swath tapering to thin spread at the sides due to the friction and consequent retarding of the manure on the sides of the body due to the custom of conically piling the load centrally along its length. Our object is to overcome these disadvantages and to so spread the manure that all of the land will be uniformly fertilized with economy of manure.

The "cylinder" 14 is placed above and on the dischargeward side of the "primary" cylinder 8 and in close proximity at a point where the "blades" 17 and 19 will meet the outflowing manure under impulse from the "primary" cylinder. It is of the utmost importance that the cylinder 14 be located as described as the flow of manure must be met before it has passed away from the "primary" cylinder 8 and just as it begins to descend so that the two cylinders can beat the mass back and forth between them. By the use of the word "above" as applied descriptively to the relative position of the two cylinders 14 and 8, we mean that the axial center of cylinder 14 is on a plane above that of cylinder 8. It is obvious that the blades 17 and 19 may be increased in size, thus increasing the diameter of cylinder 14 and when this is done the axial center of cylinder 14 may be correspondingly lowered and yet properly meet the flow of manure and be immersed in it. The whole object of locating the cylinder 14 is so that it shall be deluged in and act on the entire flow of all the manure discharged from cylinder 8. If the "secondary" cylinder 14 was placed lower than the "primary" cylinder 8 the manure would not be pounded against a resisting body having teeth and simply would be driven to the ground unbroken. The cylinders preferably should be in close proximity so that there is no space for chunks to slip through without being cut up.

As the hereinafter described driving mechanism greatly accelerates the rotation of secondary cylinder 14 over that of said cylinder 8 in the opposite direction thereto the manure will be broken, directed and forcibly fed down on the ground. One result is that the teeth 8a after they have passed the closest point to the periphery of the cylinder 14 and have performed their work during any given cycle or revolution will be cleaned of any straws, fibers, or clinging material as this stuff will clog around them on their front faces and the down driven manure passing and now since accelerated by the cylinder 14 with greater speed than that given by "primary" cylinder 8 will easily knock this stuff off the teeth 8a because the stuff will be driven away or dislodged from the faces to which it clings by the passing manure.

In Figs. 6, 8, 9, and 10 is shown the preferable "means" for imparting motion to the "secondary" cylinder 14 whereby the said cylinder is rotated in the opposite direction from cylinder 8 and automatically may lift away from the "primary" cylinder 8, while running, to discharge unbreakable foreign pieces and return to the normal without injury to the machine or requiring attention from the operator. There is a "swinging frame" 20 pivoted above the cylinder 8 on a pivotal center 21 secured to standard 12 and inclining on an upward angle toward the dischargeward end of the machine. The swinging frame 20 carries the cylinder 14 and on the lower end of said frame 20 there is a sliding box 20ª slidably passed over said frame 20 (see Fig. 9) and having a stud 20ᵇ which is the axle of an idler 37. There is a spring rod 22 hooked into an ear 20ᶜ of said box 20ª, and a spiral spring 23 surrounding said spring rod 22 and causing tension between said sliding box 20ª and the frame 20 by means of a lip 20ᵈ of said frame 20 through which the spring rod 22 passes and against the outer side of which the spring 23 bears, an adjustable nut 24 screwed on the spring rod 22 gives the required tension. A drive chain 25 passes around the idler 37 and on its lower periphery engages a driving sprocket 26 rigidly attached to the cylinder shaft 10 by any well known means not necessary to be shown here. The chain 25 drives a small sprocket 27 rigidly attached to the "axle or core" 15 of the "secondary" cylinder 14 by means of a pin or key 32. The axle 15 will rotate in the bearing aperture 20ᵉ. There is a similar "swinging frame" (not shown) pivoted in line with the frame 20 on the opposite side of the machine and having a like bearing aperture for the axle 15 but as the cylinder 14 is driven from one end only that opposite said frame does not extend beyond a line Z—Z drawn across the frame 20 (see Fig. 6).

There is a "stop device" 28 rigidly attached to near the end of the side of the body 1 just in front of the cylinder 14 that forms a slot in which the frame 20 is slidably arranged limiting the movement of the frame 20 in both directions as shown in Fig. 10. The cylinder 14 and parts because of their weight normally operate with the "blades" 17 and 19 in close proximity to the cylinder 8 but on occasion may lift up and consequently away from said proximity by reason of the pivotal point of the frame 20 being located remote from the axis of the cylinder 8 as shown. It will be noted that the speed of the cylinder 14 is greatly increased over that of "primary" cylinder 8 by the driving mechanism shown and described, the result is that as the manure comes in contact with its "blades" 17 and 19 it will strike the manure violently and so become effective for the purposes heretofore described.

The equalizing device shown in Figs. 6, 8, and 9 and heretofore described is for the purpose of tension on the chain 25 both for wear as well as because of the pivotal requirements of the frame 20, as said frame 20 swings upward as shown in dotted lines in Fig. 8 its lower end swings down and closer to the sprocket 26 by this device the idler 37 may back off so as not to jam against said sprocket 26 under these conditions. An alternative support for the cylinder 14 is seen in Fig. 11. Here there are arms 18 that are rigidly connected to the sides of the machine and there are bearing boxes 18ª and 18ᵇ to suitably receive the rotative ends of axle 15. These bearing boxes 18ª and 18ᵇ are removably connected to the supports 18 by means of bolts 29 so that the cylinder may be removed bodily without disturbing the rest of the machine. In connection with the use of rigid arms 18 any other well known means for imparting motion to cylinder 14, other than that previously described, may be employed.

We claim:—

1. In a manure spreader construction, in combination with a body of the vehicle for transporting the manure, of means to feed the manure endwise of the body, a primary rotating cylinder positioned at one end of said body having projections to pulverize and discharge the manure from said body, a secondary cylinder rotating in the opposite direction from said first-mentioned cylinder and positioned longitudinally of the first-mentioned cylinder above and on the manure discharge side thereof and in close proximity thereto, said secondary cylinder provided with a right and left diverging series of blades radially and obliquely disposed to the axle of the said cylinder and diverging step by step from right to left about midway of the longitudinal center line of said body, and means to impart motion to said secondary cylinder.

2. In a manure spreader construction, in combination with a body, of a pulverizing and discharging cylinder positioned at one end of said body, a secondary pulverizing and directing cylinder positioned on the manure discharge side and over said first-mentioned cylinder and longitudinally thereto, a chain driving mechanism connecting said first and second-mentioned cylinders, a swinging frame pivotally connected with said body and projecting longitudinally therefrom whereby the axle of said secondary cylinder is supported, a driven sprocket wheel connected with the axle of said secondary cylinder and a driving sprocket on the axle of said first mentioned cylinder, an idler mounted on one end of said frame for continuously driving said secondary cylinder in all positions of adjustment.

3. In a manure spreader construction, in combination with a body, a rotating pulverizing and discharging cylinder positioned at one end thereof, a secondary cylinder positioned over said first mentioned cylinder on the manure discharge side thereof, a chain drive mechanism connecting with said cylinders, a swinging frame for said secondary cylinder pivotally connected to the body of said vehicle, one end of said frame provided with a bearing for said secondary cylinder and the opposite end of said frame provided with an idler for said chain and automatic adjustable means for the chain tightening idler to hold the chain in working position.

4. In a manure spreader construction, in combination with a body, of means for moving the manure dischargeward in the body, a primary rotating cylinder provided with projections, said projections operating in the manure to pulverize and discharge it from said body, a manure detaining device positioned over said cylinder and in close proximity thereto to hold the manure against the projections of said rotating cylinder, a secondary rotating cylinder, connecting driving mechanism from the first to second mentioned cylinder running it in an opposite direction from the first mentioned cylinder's motion, said secondary cylinder comprising thin blades set obliquely to the line of travel of the manure from the first mentioned cylinder, said blades to meet the outflowing manure from said first mentioned cylinder obliquely and pulverize the manure into fine particles and direct its flow by a screw like movement of said blades.

5. In a manure spreader construction, in combination, a body, a manure feeding belt mechanism for said body, a primary rotating cylinder provided with projections which form a part thereof positioned at one end of said body and rotating upwardly against a manure detaining device positioned over said cylinder, a secondary rotating cylinder positioned over said first mentioned cylinder on the manure discharge side thereof in close proximity thereto, said secondary rotating cylinder provided with radially arranged blades forming a part thereof, the sides of said blades obliquely disposed to the axle of said cylinder and set in screw like form, said blades constructed of thin pieces of metal to cut the manure into small particles as it flows from the first-mentioned cylinder and with broad sides to direct it from between said cylinders to the ground.

6. In a manure spreader construction, in combination, a body, a manure moving mechanism to feed the manure along in the body, a primary rotating cylinder positioned at one end of said body and provided with projections forming a part of said cylinder, said projections acting upon the manure in the body of the spreader to pulverize and discharge the manure upward and outwardly from said body, a manure detaining device positioned over said cylinder against which the manure is moved in the act of discharging it from said body, a secondary rotating manure pulverizing and directing cylinder positioned over the said first mentioned cylinder on the manure discharge side thereof, and rotating in an opposite direction from said first mentioned cylinder, said secondary rotating cylinder provided with blades positioned in screwlike form right and left to force the manure sidewise between said cylinders to the ground.

7. In a manure spreader construction, in combination, a body, a rotating cylinder provided with projections acting upon the manure in said body to pulverize and discharge the same from said body, a manure detaining device positioned over said cylinder, a secondary rotating cylinder located on the rearward side of said primary cylinder, blades rigidly attached to said secondary cylinder and diverging obliquely and radially from midway of the length of said cylinder, means for rotating said cylinder, said two cylinders acting in opposition to each other in their rotations to disintegrate the manure and pulverize and direct it between two cylinders upon the ground.

8. In a manure spreader construction, in combination, a body, a manure conveying beltlike mechanism located in said body, a primary rotating manure pulverizing and discharging cylinder provided with projections, said cylinder positioned at one end of said manure conveying belt, a manure detaining mechanism located over said cylinder and in close proximity thereto, a secondary rotating cylinder positioned over and to one side and in close proximity to said first mentioned cylinder, the periphery of said secondary cylinder moving at a higher velocity than the periphery of said first mentioned cylinder and provided with a series of thin blades, the plane of said blades setting obliquely to the longitudinal line of said secondary cylinder's axle, said blades so positioned in forming said secondary cylinder as to be a screwlike construction operating against said manure in a manner as a divided or sectional screw, one right and one left hand, with blade edges to cut the chunks of manure into fine particles and with sides to cause the manure to progress sidewise.

9. In a manure spreader construction, in combination with a body of the vehicle, of a manure feed belt located in the body, a rotating cylinder having projections, said cylinder positioned at one end of said feed belt, its projections acting against the manure to pulverize and discharge it from the body, a manure detaining mechanism positioned above said cylinder and in close proxinity thereto against which the manure comes in contact by action of the projections of said cylinder and by said feed belt, a secondary rotating pulverizing and directing cylinder positioned above said first mentioned cylinder on the manure discharge side thereof and in close proximity thereto, rotating in opposite direction from said first mentioned cylinder and comprising blades setting obliquely to the line of axle of said cylinder and forming right and left hand screws, said blades acting to meet and pulverize the manure as it comes from the first mentioned cylinder and by the screwlike disposition of the blades to direct the manure in a clearly demarked swath.

10. In a manure spreader construction, in combination with a body, of means within said body for moving the manure endwise, a primary rotating cylinder having projections around its periphery to pulverize and discharge the manure from said body, a stationary manure detaining device positioned above said first mentioned cylinder and in close proximity thereto, and acting in conjunction with said cylinder to pulverize the manure, a secondary rotating cylinder positioned over said first mentioned cylinder and to the manure discharge side thereof in close proximity thereto and rotating in an opposite direction from the first mentioned cylinder, said secondary rotating cylinder comprising a central axle shaft, a series of radially projecting blades connected thereto obliquely disposed across the line of axle of the said cylinder, said blades arranged in a right and left hand screwlike shape from about the center of said axle in line of its length, the edges of said blades acting to rend the manure into small particles and having obliquely arranged broad sides to force it downward and sidewise between the two cylinders.

11. In a manure spreader construction, in combination with a body, of a primary rotating pulverizing and discharging cylinder provided with projections to act upon the manure in the body to pulverize and discharge the manure from said body, a secondary rotating cylinder positioned over said first mentioned cylinder on the manure discharge side thereof and in close proximity thereto, a series of blades fixedly attached in screwlike form to a central portion of said secondary cylinder and forming a part thereof, one series of blades following the other in step outwardly to the right and another series oppositely to the left.

12. In a manure spreader construction, in combination, a body, means for moving the manure dischargeward in said body, a primary rotating cylinder having projections around its periphery to separate and discharge the manure from said body, a detaining mechanism on a plane above said primary cylinder, a secondary rotating cylinder located on the rearward side of said first-mentioned cylinder and in proximity thereto, said secondary cylinder having thin wide blades on several sides thereof and rigidly attached thereto, said blades arranged in series to the right and left, one series of said blades arranged in a screwlike form to the right and another to the left from about the center of said cylinder and other series of said blades arranged to the right and left of the center within the spirals formed by the first mentioned series.

13. In a manure spreader construction, in combination with a body, of means for moving the manure dischargeward of the said body, a rotating cylinder having projections around its periphery positioned at one end of said body, a stationary detaining mechanism over said cylinder and in close proximity thereto, a secondary rotating cylinder positioned over said first mentioned cylinder and on the manure discharge side thereof and in close proximity thereto, said secondary cylinder comprising a core with a series of wide thin blades connected thereto, said blades obliquely disposed to the line of draft, one series of said blades arranged in a screwlike form to the right and another to the left from about the center of said cylinder and other series of said blades arranged to the right and left of the center within the spirals formed by the first mentioned series.

14. In a manure spreader construction, in combination with a body, of a rotating cylinder provided with projections operating on the manure as it is moved against it, the projections of the said cylinder having a pulverizing and discharging action on the manure, a secondary rotating cylinder positioned over said first mentioned cylinder and on the manure discharge side thereof, means for driving said secondary cylinder in an opposite direction from said first mentioned cylinder, blades of said secondary rotating cylinder surrounding the central part thereof, said blades arranged in right and left centrally diverging series, each blade of each said series having an edge contacting at a different point on the outflowing manure than that of its fellows.

15. In a manure spreader construction, in combination, a manure body receptacle, means for feeding the manure outwardly from said body, two rotating opposing cylinders each provided with projections on their peripheries, one a primary pulverizing and discharging cylinder the other a secondary refining and directing cylinder located on the dischargeward side of said primary cylinder and in the manure discharge path, the projections on the peripheries of both said cylinders constituting means to pulverize the manure by disintegrating it in a troughlike space formed between said two cylinders, the projections on the periphery of said secondary cylinder also constituting means whereby the manure is driven downward and distributed laterally and means for rotatively driving said two cylinders.

In testimony whereof, we affix our signatures, in presence of two witnesses.

WILLIAM N. WHITELY.
WILLIAM N. WHITELY, Jr.

Witnesses:
CHARLES J. McNIERY,
CHARLES H. SHANNAN.